Patented May 24, 1927.

1,629,528

UNITED STATES PATENT OFFICE.

FRANCIS H. POUGH, OF ST. LOUIS, MISSOURI, ASSIGNOR, BY MESNE ASSIGNMENTS, TO SOUTHERN ACID & SULPHUR COMPANY, INCORPORATED, A CORPORATION OF VIRGINIA.

PREPARED SULPHUR.

No Drawing. Application filed November 24, 1924, Serial No. 752,033. Renewed April 8, 1927.

Sulphur is a recognized fungicide and, when sufficiently finely divided, is well suited for application to orchard trees and the like by the process of "dusting". This process comprises the blowing of the sulphur in a cloud of dust that reaches and settles on all parts of the tree. Among the principal merits of such process are these: It requires no mixing or preparation of chemicals, it is very rapid, and it not only distributes the sulphur very thoroughly but leaves it on the trees. Notwithstanding its recognized merits, however, the dusting process is not used nearly so extensively as liquid spraying processes because finely divided sulphur has a tendency to aggregate into pellets that pass through the blower without being disintegrated and not only impair the thoroughness of the distribution but fall to the ground instead of remaining on the trees. The purpose of the present invention is to overcome or minimize this tendency to aggregate, without impairing the fungicidal value of the sulphur; and the invention consists principally in mixing with the sulphur a sufficient quantity of carbonate of magnesium in a finely divided form.

For use as a fungicide to be applied in the form of a "dust," the more finely divided the sulphur is, the better is it adapted for its purpose; but the more finely divided it is, the more likely it is to aggregate into pellets. To offset this tendency, I thoroughly mix with the finely divided sulphur a quantity of carbonate of magnesium in a finely divided form. The carbonate of magnesium is preferably even more finely divided than the sulphur; and, for this reason, it is desirable to use precipitated carbonate of magnesium.

As the tendency of the sulphur to aggregate is a continuing one, the amount of carbonate of magnesium to be mixed therewith should be greater where the sulphur is to be stored for a considerable length of time than is necessary where the sulphur is to be used promptly. Two parts by weight of carbonate of magnesium are sufficient to give satisfactory results with one hundred parts by weight of sulphur when the sulphur is to be used promptly, and even so little as one part by weight may give good results when the sulphur is to be used promptly and other conditions are favorable; whereas it may be advisable to use as much as ten per cent by weight when the sulphur is intended to be kept for a considerable time under adverse conditions. In ordinary commercial practice, however, the preferable amount of carbonate of magnesium is about five per cent of the weight of the sulphur.

In the composition, the sulphur is the active element and the carbonate of magnesium is practically inert as a fungicide. On the other hand, the carbonate has no deleterious effect either on the foliage or on the fungicidal value of the sulphur; and it forms so small a proportion of the mixture as to increase only slightly the cost of handling, shipping, and distributing the sulphur.

What I claim is:

1. Finely divided sulphur having mixed therewith finely divided carbonate of magnesium in the proportion of about 100 parts by weight of sulphur to 5 parts by weight of carbonate of magnesium.

2. A composition of matter comprising finely divided sulphur and finely divided carbonate of magnesium in substantially the proportion specified.

3. Finely divided sulphur having mixed therewith finely divided carbonate of magnesium in the following proportions: sulphur, 100 parts by weight, and carbonate of magnesium, from 2 to 10 parts by weight.

Signed at St. Louis, Missouri, this 19th day of November, 1924.

FRANCIS H. POUGH.